United States Patent
Kachmar et al.

(10) Patent No.: US 9,472,314 B2
(45) Date of Patent: Oct. 18, 2016

(54) POWER/FIBER HYBRID CABLE

(71) Applicant: CommScope Technologies LLC, Hickory, NC (US)

(72) Inventors: Wayne M. Kachmar, North Bennington, VT (US); Aly Fahd, Troy, NY (US); Kenneth Christopher Nardone, North Bennington, VT (US); Wagner da Silva Aguiar, Brunswick, NY (US); William J. Jacobsen, Hoosick Falls, NY (US)

(73) Assignee: COMMSCOPE TECHNOLOGIES LLC, Hickory, NC (US)

( * ) Notice: Subject to any disclaimer, the term of this patent is extended or adjusted under 35 U.S.C. 154(b) by 0 days.

(21) Appl. No.: 14/277,347

(22) Filed: May 14, 2014

(65) Prior Publication Data
US 2014/0338968 A1 Nov. 20, 2014

Related U.S. Application Data

(60) Provisional application No. 61/823,125, filed on May 14, 2013.

(51) Int. Cl.
*G02B 6/44* (2006.01)
*H01B 1/02* (2006.01)

(52) U.S. Cl.
CPC ............ *H01B 1/026* (2013.01); *G02B 6/4416* (2013.01); *G02B 6/4495* (2013.01)

(58) Field of Classification Search
CPC ....... H01B 6/005; H01B 7/009; H01B 1/026
USPC ................... 385/101; 174/70 R, 99 R, 117 R
See application file for complete search history.

(56) References Cited

U.S. PATENT DOCUMENTS

| | | | |
|---|---|---|---|
| 4,089,585 A | 5/1978 | Slaughter |
| 4,199,225 A | 4/1980 | Slaughter |
| 4,220,812 A | 9/1980 | Ney et al. |
| 4,359,598 A | 11/1982 | Dey et al. |
| 4,365,865 A | 12/1982 | Stiles |
| 4,467,138 A | 8/1984 | Brorein |
| 4,497,537 A | 2/1985 | Dench |
| 4,552,432 A | 11/1985 | Anderson et al. |
| 4,695,127 A | 9/1987 | Ohlhaber et al. |

(Continued)

FOREIGN PATENT DOCUMENTS

| | | |
|---|---|---|
| EP | 0 629 889 A1 | 12/1994 |
| EP | 2 393 222 A1 | 12/2011 |

(Continued)

OTHER PUBLICATIONS

OneReach PoE Extender System brochure from Berk-Tek, 8 pages (Jan. 2011).

(Continued)

*Primary Examiner* — Ellen Kim
(74) *Attorney, Agent, or Firm* — Merchant & Gould P.C

(57) ABSTRACT

The present disclosure relates to a hybrid cable having a jacket with a central portion positioned between left and right portions. The central portion contains at least one optical fiber and the left and right portions contain electrical conductors. The left and right portions can be manually torn from the central portion.

24 Claims, 7 Drawing Sheets

(56) References Cited

U.S. PATENT DOCUMENTS

| | | |
|---|---|---|
| 4,723,832 A | 2/1988 | Okazato et al. |
| 4,729,628 A | 3/1988 | Kraft et al. |
| 4,761,053 A | 8/1988 | Cogelia et al. |
| 4,787,705 A | 11/1988 | Shinmoto et al. |
| 4,867,527 A | 9/1989 | Dotti et al. |
| 4,895,426 A | 1/1990 | Pinson |
| 5,268,971 A | 12/1993 | Nilsson et al. |
| 5,448,670 A | 9/1995 | Blew et al. |
| 5,469,523 A | 11/1995 | Blew et al. |
| 5,494,461 A | 2/1996 | Bippus et al. |
| 5,539,851 A | 7/1996 | Taylor et al. |
| 5,555,336 A | 9/1996 | Winslow |
| 5,555,338 A | 9/1996 | Haag et al. |
| 5,557,698 A | 9/1996 | Gareis et al. |
| 5,651,081 A | 7/1997 | Blew et al. |
| 5,677,974 A | 10/1997 | Elms et al. |
| 5,737,470 A | 4/1998 | Nagano et al. |
| 5,745,627 A | 4/1998 | Arroyo et al. |
| 5,778,116 A | 7/1998 | Tomich |
| 5,838,858 A | 11/1998 | White |
| 5,896,480 A | 4/1999 | Scharf et al. |
| 5,913,003 A | 6/1999 | Arroyo et al. |
| 5,982,966 A | 11/1999 | Bonicel |
| 6,142,802 A | 11/2000 | Berg et al. |
| 6,169,834 B1 | 1/2001 | Keller |
| 6,195,487 B1 | 2/2001 | Anderson et al. |
| 6,236,789 B1 | 5/2001 | Fitz |
| 6,343,172 B1 | 1/2002 | Schiestle |
| 6,347,172 B1 | 2/2002 | Keller et al. |
| 6,363,192 B1 | 3/2002 | Spooner |
| 6,370,303 B1 | 4/2002 | Fitz et al. |
| 6,463,198 B1 | 10/2002 | Coleman |
| 6,493,491 B1 | 12/2002 | Shen et al. |
| 6,542,674 B1 | 4/2003 | Gimblet |
| 6,567,592 B1 | 5/2003 | Gimblet et al. |
| 6,599,025 B1 | 7/2003 | Deutsch |
| 6,621,964 B2 | 9/2003 | Quinn et al. |
| 6,687,437 B1 | 2/2004 | Starnes et al. |
| 6,719,461 B2 | 4/2004 | Cull |
| 6,738,547 B2 | 5/2004 | Spooner |
| 6,755,575 B2 | 6/2004 | Kronlund et al. |
| 6,758,693 B2 | 7/2004 | Inagaki et al. |
| 6,836,603 B1 | 12/2004 | Bocanegra et al. |
| 6,847,767 B2 | 1/2005 | Hurley et al. |
| 6,931,183 B2 | 8/2005 | Panak et al. |
| 6,965,718 B2 | 11/2005 | Koertel |
| 7,006,740 B1 | 2/2006 | Parris |
| 7,085,459 B2 * | 8/2006 | Conrad ............... G02B 6/4404 385/114 |
| 7,158,703 B2 | 1/2007 | Mjelstad |
| 7,218,821 B2 | 5/2007 | Bocanegra et al. |
| 7,225,534 B2 | 6/2007 | Kachmar |
| 7,272,281 B2 | 9/2007 | Stahulak et al. |
| 7,310,430 B1 | 12/2007 | Mallya et al. |
| 7,362,936 B2 | 4/2008 | Stark et al. |
| 7,371,014 B2 | 5/2008 | Willis et al. |
| 7,387,517 B2 | 6/2008 | Kusuda et al. |
| 7,401,985 B2 | 7/2008 | Aronson et al. |
| 7,445,389 B2 | 11/2008 | Aronson |
| 7,494,287 B2 | 2/2009 | Wang et al. |
| 7,499,616 B2 | 3/2009 | Aronson et al. |
| 7,643,631 B2 | 1/2010 | Kennedy |
| 7,643,713 B2 | 1/2010 | Büthe et al. |
| 7,692,098 B2 | 4/2010 | Wyatt, II et al. |
| 7,712,976 B2 | 5/2010 | Aronson et al. |
| 7,744,288 B2 | 6/2010 | Lu et al. |
| 7,762,727 B2 | 7/2010 | Aronson |
| 7,778,510 B2 | 8/2010 | Aronson et al. |
| 7,876,989 B2 | 1/2011 | Aronson et al. |
| 7,897,873 B2 | 3/2011 | Gemme et al. |
| 7,918,609 B2 | 4/2011 | Melton et al. |
| 8,041,166 B2 | 10/2011 | Kachmar |
| 8,059,929 B2 | 11/2011 | Cody et al. |
| 8,083,417 B2 | 12/2011 | Aronson et al. |
| 8,155,525 B2 | 4/2012 | Cox |
| 8,175,433 B2 | 5/2012 | Caldwell et al. |
| 8,184,935 B2 | 5/2012 | Kachmar |
| 8,204,348 B2 | 6/2012 | Keller et al. |
| 8,238,706 B2 | 8/2012 | Kachmar |
| 8,244,087 B2 | 8/2012 | Sales Casals et al. |
| 8,249,410 B2 | 8/2012 | Andrus et al. |
| 8,270,838 B2 | 9/2012 | Cox |
| 8,290,320 B2 | 10/2012 | Kachmar |
| 8,297,854 B2 | 10/2012 | Bickham et al. |
| 8,301,003 B2 | 10/2012 | de los Santos Campos et al. |
| 8,328,433 B2 | 12/2012 | Furuyama |
| 8,363,994 B2 | 1/2013 | Kachmar |
| 8,480,312 B2 | 7/2013 | Smith et al. |
| 8,682,124 B2 * | 3/2014 | Logan ............... G02B 6/4495 385/100 |
| 9,274,302 B2 * | 3/2016 | Gimblet ............... G02B 6/4495 |
| 2002/0126967 A1 | 9/2002 | Panak et al. |
| 2002/0136510 A1 | 9/2002 | Heinz et al. |
| 2002/0147978 A1 | 10/2002 | Dolgonos et al. |
| 2003/0108351 A1 | 6/2003 | Feinberg et al. |
| 2003/0202756 A1 | 10/2003 | Hurley et al. |
| 2003/0215197 A1 | 11/2003 | Simon et al. |
| 2004/0258165 A1 | 12/2004 | Peltonen |
| 2005/0002622 A1 | 1/2005 | Sutehall et al. |
| 2005/0185903 A1 | 8/2005 | Koertel |
| 2006/0153516 A1 | 7/2006 | Napiorkowski et al. |
| 2006/0165355 A1 | 7/2006 | Greenwood et al. |
| 2007/0269170 A1 | 11/2007 | Easton et al. |
| 2008/0037941 A1 | 2/2008 | Mallya |
| 2008/0131132 A1 | 6/2008 | Solheid et al. |
| 2008/0219621 A1 | 9/2008 | Aldeghi et al. |
| 2008/0297104 A1 | 12/2008 | Rao et al. |
| 2009/0041413 A1 | 2/2009 | Hurley |
| 2009/0297104 A1 | 12/2009 | Kachmar |
| 2010/0200270 A1 | 8/2010 | Gemme et al. |
| 2010/0290787 A1 | 11/2010 | Cox |
| 2010/0321591 A1 | 12/2010 | Onomatsu |
| 2011/0021069 A1 | 1/2011 | Hu et al. |
| 2011/0038582 A1 | 2/2011 | DiFonzo et al. |
| 2011/0091174 A1 | 4/2011 | Kachmar |
| 2011/0188815 A1 | 8/2011 | Blackwell, Jr. et al. |
| 2011/0268452 A1 | 11/2011 | Beamon et al. |
| 2011/0280527 A1 | 11/2011 | Tamura |
| 2011/0293227 A1 | 12/2011 | Wu |
| 2011/0311191 A1 | 12/2011 | Hayashishita et al. |
| 2012/0008904 A1 | 1/2012 | Han et al. |
| 2012/0008905 A1 | 1/2012 | Han et al. |
| 2012/0008906 A1 | 1/2012 | Han et al. |
| 2012/0057821 A1 | 3/2012 | Aronson et al. |
| 2012/0080225 A1 | 4/2012 | Kim et al. |
| 2012/0114288 A1 | 5/2012 | Wu |
| 2012/0191997 A1 | 7/2012 | Miller |
| 2012/0230637 A1 | 9/2012 | Kachmar |
| 2012/0281952 A1 | 11/2012 | McColloch |
| 2012/0281953 A1 | 11/2012 | Choi et al. |
| 2012/0288245 A1 | 11/2012 | Hurley et al. |
| 2012/0295486 A1 | 11/2012 | Petersen et al. |
| 2013/0011106 A1 | 1/2013 | Congdon, II et al. |
| 2013/0022318 A1 | 1/2013 | Fingler et al. |
| 2013/0287349 A1 * | 10/2013 | Faulkner ............... G02B 6/4416 385/101 |
| 2014/0072264 A1 | 3/2014 | Schroder et al. |
| 2014/0258742 A1 | 9/2014 | Chien et al. |
| 2015/0125146 A1 | 5/2015 | Erreygers et al. |
| 2015/0309271 A1 | 10/2015 | Huegerich et al. |
| 2015/0378118 A1 | 12/2015 | Huegerich et al. |

FOREIGN PATENT DOCUMENTS

| | | |
|---|---|---|
| EP | 2 676 161 | 12/2013 |
| KR | 10-1997-0060748 A | 8/1997 |
| KR | 20-0273482 Y1 | 4/2002 |
| WO | WO 2010/102201 A2 | 9/2010 |
| WO | WO 2011/146720 A2 | 11/2011 |

(56) References Cited

FOREIGN PATENT DOCUMENTS

WO WO 2012/112532 A2 8/2012
WO WO 2013/117598 A2 8/2013

OTHER PUBLICATIONS

International Search Report and Written Opinion for PCT/US2014/015969 mailed Jul. 21, 2014.
International Search Report and Written Opinion for PCT/US2014/000115 mailed Sep. 24, 2014.
"GE—Critical Power, DAS and Small Cell Powering Architectures," DAS and Small Cell Congress, May 1, 2013; 22 pages.
International Search Report and Written Opinion for PCT/US2014/046678 mailed Nov. 6, 2014.
International Search Report and Written Opinion for PCT/US2014/030969 mailed Nov. 26, 2014.

\* cited by examiner

POWER/FIBER HYBRID CABLE

CROSS-REFERENCE TO RELATED APPLICATION

The present application claims the benefit of U.S. Provisional Patent Application Ser. No. 61/823,125, filed May 14, 2013, which application is hereby incorporated by reference in its entirety.

TECHNICAL FIELD

The present disclosure relates generally to hybrid communication systems. More particularly, the present disclosure relates to telecommunications cables capable of transmitting both optical signals and electrical power.

BACKGROUND

Rapid growth of portable high-speed wireless transceiver devices (e.g., smartphones, tablets, laptop computers, etc.) continues in today's market, thereby creating higher demand for untethered contact. Thus, there is growing demand for integrated voice, data and video capable of being transmitted wirelessly at high data transmission rates. To provide the bandwidth needed to support this demand will require the cost effective and efficient deployment of additional fixed location transceivers (i.e., cell sites or nodes) generating both large and small wireless coverage areas. Telecommunications cables capable transmitting both electrical power and optical signals that are capable of being manufactured and installed in an effective, cost effective manner can greatly enhance the ability of service providers to implement coverage areas suitable for meeting growing market demands.

SUMMARY

One aspect of the present disclosure relates to a cable carries both electrical power and optical communications. In certain examples, the electrical power and optical communications can be directed to a device for generating a cellular coverage area (e.g., a macrocell, a microcell, a metrocell, a picocell, a femtocell, etc.)

Another aspect of the present disclosure relates to telecommunications cables that facilitate the fast, low cost and simple deployment of optical fiber and power to interface with active devices such as devices for generating wireless communication coverage areas (e.g., wireless transceivers) and other active devices (e.g., cameras).

Still other aspects of the present disclosure relate to hybrid power/optical fiber cables that facilitate the deployment of wireless communication coverage areas at various locations such as stadiums, shopping areas, hotel, high rise office buildings, multi-dwelling units, suburban environments, corporate and university campuses, in-building areas, near-building areas, tunnels, canyons, roadside areas and coastal areas. Still further aspects of the present disclosure relate to power/optical fiber hybrid cables that enhance the coverage areas provided by cellular technologies (e.g., GSM, CDMA, UMTS, LTE, IiMax, WiFi, etc.).

A further aspect of the present disclosure relates to a hybrid cable having an outer jacket including a transverse cross-sectional profile that defines a major axis and a minor axis. The outer jacket has a height measured along the minor axis and a width measured along the major axis. The width is greater than the height such that the transverse cross-sectional profile of the outer jacket is elongated along the major axis. The outer jacket includes a left portion, a right portion and a central portion. The left, right and central portions are positioned along the major axis with the central portion being disposed between the left and right portions. The left portion defines a left passage, the right portion defines a right passage and the central portion defines a central passage. The hybrid cable also includes a left electrical conductor positioned within the left passage, a right electrical conductor positioned within the right passage and at least one optical fiber positioned within the central passage. The hybrid cable includes a left pre-defined tear location positioned between the central portion and the left portion of the outer jacket and a right pre-defined tear location positioned between the central portion and the right portion of the outer jacket. The left pre-defined tear location is weakened such that the left portion of the outer jacket can be manually torn from the central portion of the outer jacket. The left pre-defined tear location is configured such that the left portion of the outer jacket fully surrounds the left passage and the central portion of the outer jacket fully surrounds the central passage after the left portion of the outer jacket has been torn from the central portion of the outer jacket. The right pre-defined tear location is weakened such that the right portion of the outer jacket can be manually torn from the central portion of the outer jacket. The right pre-defined tear location is configured such that the right portion of the outer jacket fully surrounds the right passage and the central portion of the outer jacket fully surrounds the central passage after the right portion of the outer jacket has been torn from the central portion of the outer jacket.

A variety of additional inventive aspects will be set forth in the description that follows. The inventive aspects can relate to individual features and to combinations of features. It is to be understood that both the forgoing general description and the following detailed description are exemplary and explanatory only and are not restrictive of the broad inventive concepts upon which the examples disclosed herein are based.

DETAILED DESCRIPTION

Figure 1:
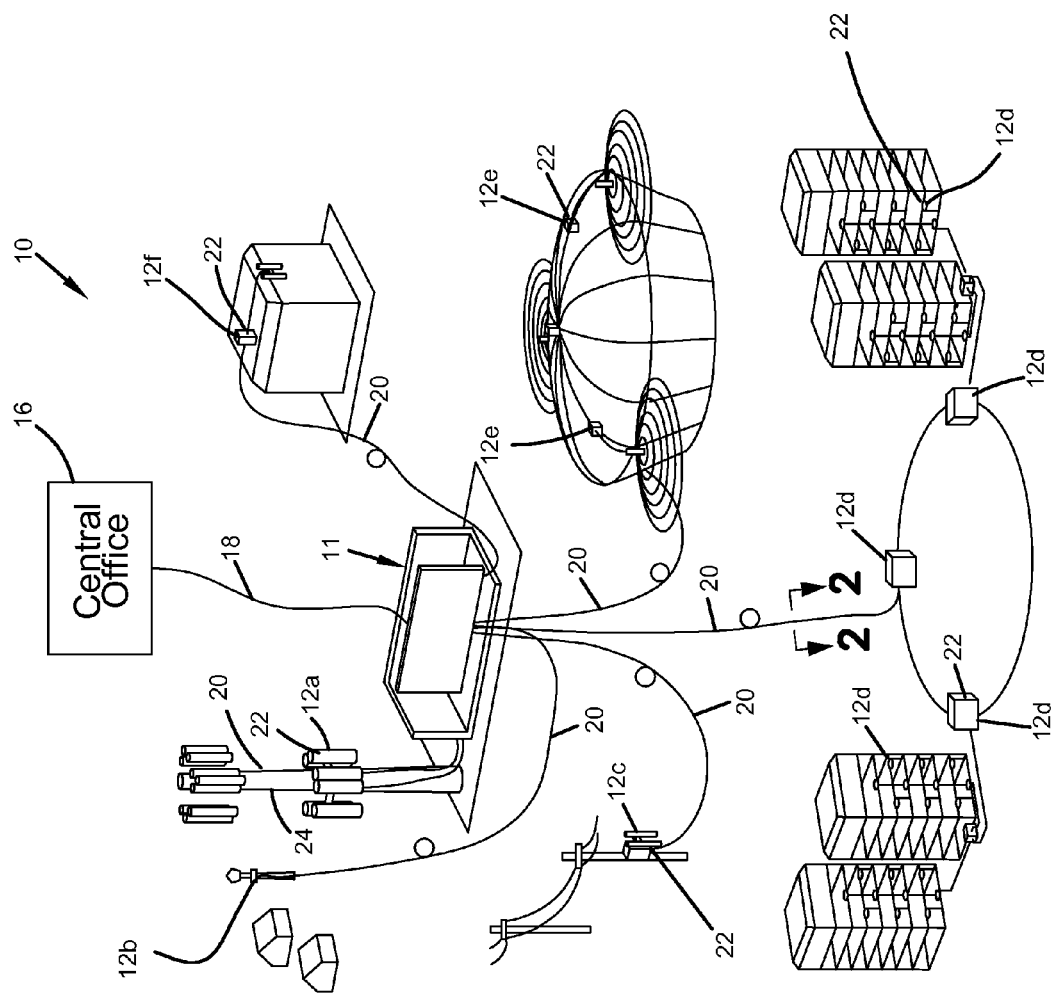
FIG. 1 is a system diagram showing an example distribution of wireless coverage areas deployed using a hybrid cable system in accordance with the principles of the present disclosure.

Various examples will be described in detail with reference to the figures, wherein like reference numerals represent like parts and assemblies throughout the several views. Any examples set forth in this specification are not intended to be limiting and merely set forth some of the many possible variations of the inventive aspects disclosed herein.

FIG. 1 shows a system 10 in accordance with the principles of the present disclosure for enhancing the coverage areas provided by cellular technologies (e.g., GSM, CDMA, UMTS, LTE, WiMax, WiFi, etc.). The system 10 includes a base location 11 (i.e., a hub) and a plurality of wireless coverage area defining equipment 12a, 12b, 12c, 12d, 12e and 12f distributed about the base location 11. In certain example, the base location 11 can include a structure 14 (e.g., a closet, hut, building, housing, enclosure, cabinet, etc.) protecting telecommunications equipment such as racks, fiber optic adapter panels, passive optical splitters, wavelength division multi-plexers, fiber splice locations, optical fiber patching and/or fiber interconnect structures and other active and/or passive equipment. In the depicted example, the base location 11 is connected to a central office 16 or other remote location by a fiber optic cable such as a multi-fiber optical trunk cable 18 that provides high bandwidth two-way optical communication between the base location 11 and the central office 16 or other remote location. In the depicted example, the base location 11 is connected to the wireless coverage area defining equipment 12a, 12b, 12c, 12d, 12e and 12f by hybrid cables 20. The hybrid cables 20 are each capable of transmitting both power and communications between the base location 11 and the wireless coverage area defining equipment 12a, 12b, 12c, 12d, 12e and 12f.

The wireless coverage area defining equipment 12a, 12b, 12c, 12d, 12e and 12f can each include one or more wireless transceiver 22. The transceivers 22 can include single transceivers 22 or distributed arrays of transceivers 22. As used herein, a "wireless transceiver" is a device or arrangement of devices capable of transmitting and receiving wireless signals. A wireless transceiver typically includes an antenna for enhancing receiving and transmitting the wireless signals. Wireless coverage areas are defined around each of the wireless coverage area defining equipment 12a, 12b, 12c, 12d, 12e and 12f. Wireless coverage areas can also be referred to as cells, cellular coverage areas, wireless coverage zones, or like terms. Examples of and/or alternative terms for wireless transceivers include radio-heads, wireless routers, cell sites, wireless nodes, etc.

In the depicted example of FIG. 1, the base location 11 is shown as a base transceiver station (BTS) located adjacent to a radio tower 24 supporting and elevating a plurality the wireless coverage area defining equipment 12a. In one example, the equipment 12a can define wireless coverage areas such as a macrocells or microcells (i.e., cells each having a coverage area less than or equal to about 2 kilometers wide). The wireless coverage area defining equipment 12b is shown deployed at a suburban environment (e.g., on a light pole in a residential neighborhood) and the equipment 12c is shown deployed at a roadside area (e.g., on a roadside power pole). The equipment 12c could also be installed at other locations such as tunnels, canyons, coastal areas, etc. In one example, the equipment 12b, 12c can define wireless coverage areas such as microcells or picocells (i.e., cells each having a coverage area equal to or less than about 200 meters wide). The equipment 12d is shown deployed at a campus location (e.g., a university or corporate campus), the equipment 12e is shown deployed at a large public venue location (e.g., a stadium), and the equipment 12f is shown installed at an in-building or near-building environment (e.g., multi-dwelling unit, high rise, school, etc.). In one example, the equipment 12d, 12e, and 12f can define wireless coverage areas such as microcells, picocells, or femtocells (i.e., cells each having a coverage area equal to or less than about 10 meters wide).

Figure 2:
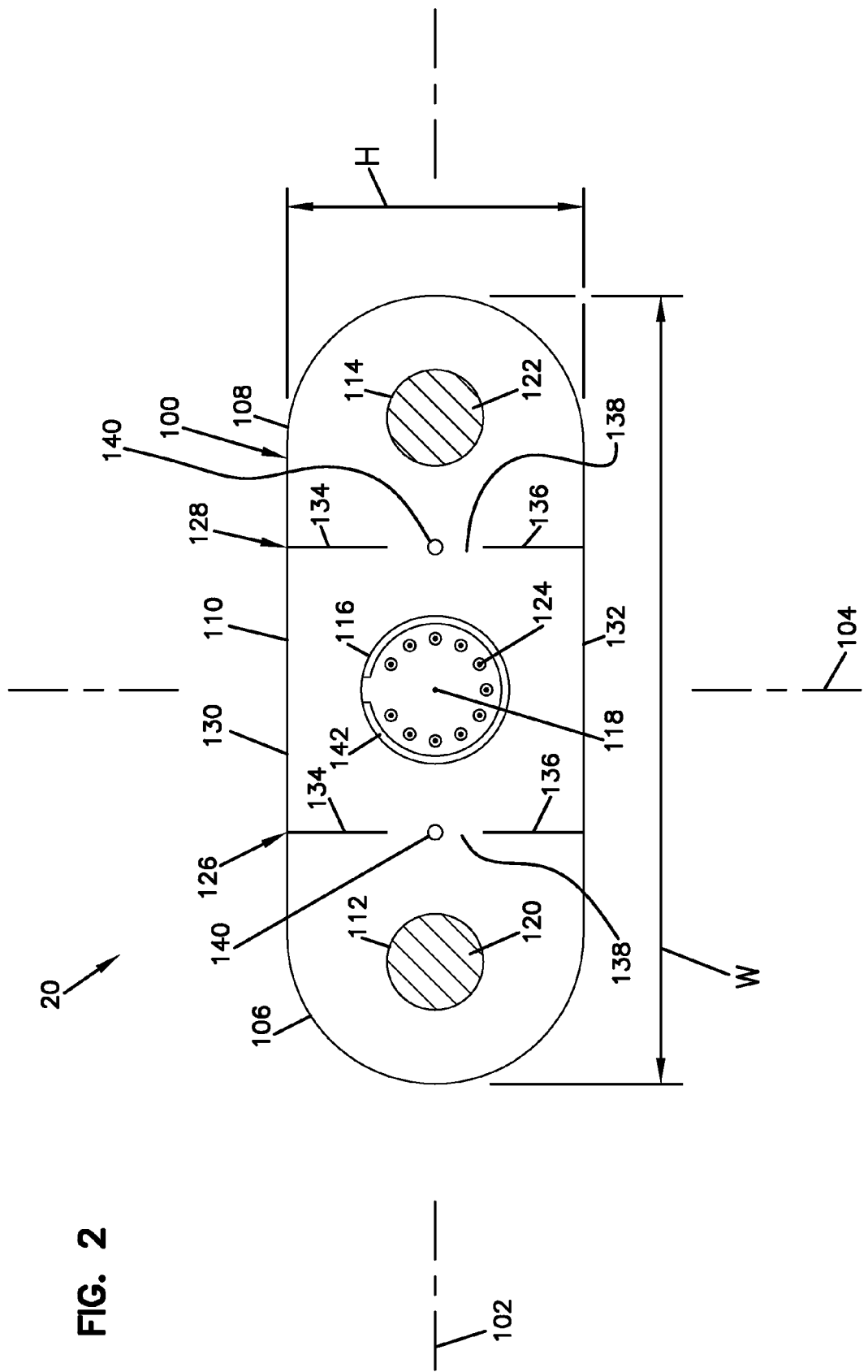
FIG. 2 is a transverse cross-sectional view of a power/optical fiber hybrid cable in accordance with the principles of the present disclosure, the cross-section is taken along section line 2-2 of FIG.

FIG. 2 is a transverse cross-sectional view taken through one of the hybrid cables 20 of FIG. 1. Hybrid cable 20 includes an outer jacket 100 having a transverse cross-sectional profile that defines a major axis 102 and a minor axis 104. The outer jacket has a height H measured along the minor axis 104 and a width W measured along the major axis 102. The width W is greater than the height H such that the transverse cross-sectional profile of the outer jacket 100 is elongated along the major axis 102.

The outer jacket 100 can include a left portion 106, a right portion 108 and a central portion 110. The left portion 106, the right portion 108 and the central portion 110 can be positioned along the major axis 102 with the central portion 110 being disposed between the left portion 106 and the right portion 108. The left portion 106 can define a left passage 112, the right portion 108 can define a right passage 114 and the central portion 110 can define a central passage 116. The passages 112, 114 and 116 can have lengths that extend along a central longitudinal axis 118 of the cable 20 for the length of the cable. A left electrical conductor 120 is shown positioned within the left passage 112, a right electrical conductor 122 is shown positioned within the right passage 114 and at least one optical fiber 124 is shown positioned within the central passage 116. The left electrical conductor 120, the right electrical conductor 122 and the optical fiber 124 have lengths that extend along the central longitudinal axis 118 of the cable 20.

Still referring to FIG. 2, the hybrid cable 20 includes a left pre-defined tear location 126 positioned between the central portion 110 and the left portion 106 of the outer jacket 100, and a right pre-defined tear location 128 positioned between the central portion 110 and the right portion 108 of the outer jacket 100. The left pre-defined tear location 126 is weakened such that the left portion 106 of the outer jacket 100 can be manually torn from the central portion 110 of the outer jacket 100. Similarly, the right pre-defined tear location 128 is weakened such that the right portion 108 of the outer jacket 100 can be manually torn from the central portion 110 of the outer jacket 100. The left pre-defined tear location 126 is configured such that the left portion 106 of the outer jacket 100 fully surrounds the left passage 112 and the central portion 110 of the outer jacket 100 fully surrounds the central passage 116 after the left portion 106 of the outer jacket 100 has been torn from the central portion 110 of the outer jacket 100. In this way, the left electrical conductor 120 remains fully insulated and the optical fiber 120 remains fully protected after the left portion 106 has been torn from the central portion 110. The right pre-defined tear location 128 is configured such that the right portion 108 of the outer jacket 100 fully surrounds the right passage 114 and the central portion 110 of the outer jacket 100 fully surrounds the central passage 119 after the right portion 108 of the outer jacket 100 has been torn from the central portion 110 of the outer jacket 100. In this way, the right electrical conductor 122 remains fully insulated and the optical fiber 124 remains fully protected after the right portion 108 has been torn from the central portion 110.

Figure 3:
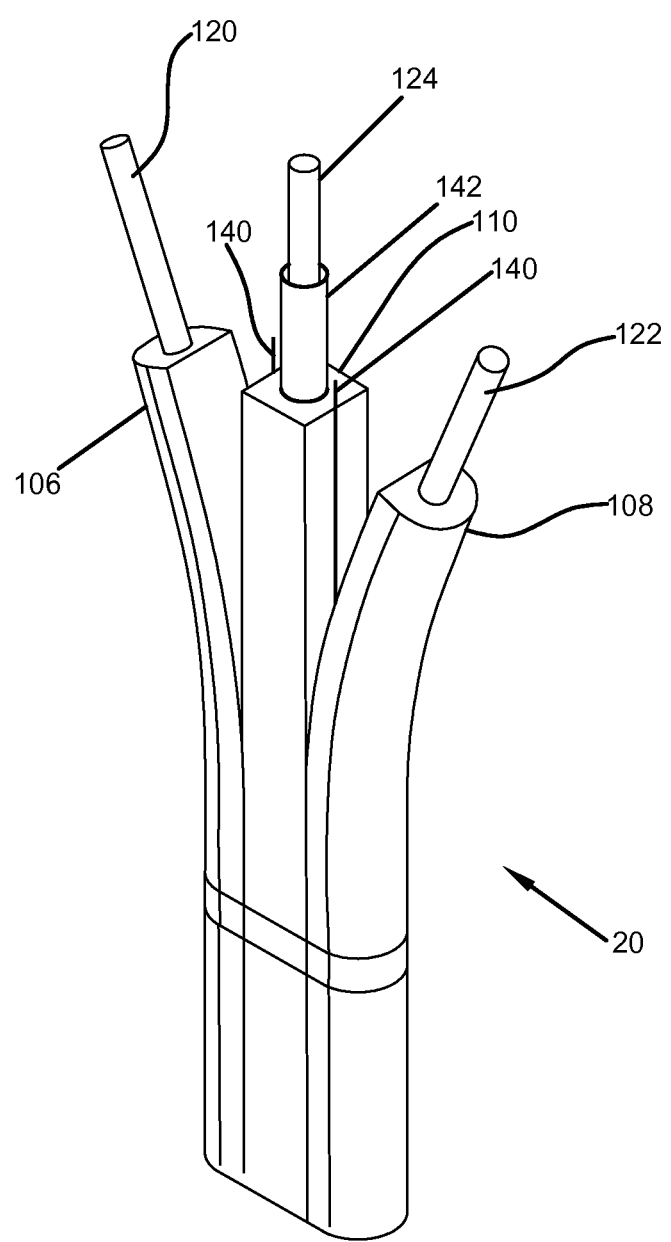
FIG. 3 is a perspective view of a portion of the hybrid cable of FIG. 2 with electrically conductive portions of the cable showing separated from a central optical fiber portion of the cable.

FIG. 3 shows the hybrid cable 20 with both the left portion 106 and the right portion 108 torn away from the central portion 110. In this configuration, both the left electrical conductor 120 and the right electrical conductor 122 are fully insulated by their corresponding left and right portions 106, 108. Additionally, the central portion 110 has a rectangular transverse cross-sectional shape that fully surrounds the central passage 116 so as to protect the optical fiber or fibers 124.

It will be appreciated that the left and right electrical conductors 120, 122 have a construction suitable for carrying electricity. It will be appreciated that the electrical conductors can have a solid or stranded construction. Example sizes of the electrical conductors include 12 gauge, 16 gauge, or other sizes.

The outer jacket 100 is preferably constructed of a polymeric material. In one example, the hybrid cable 20 and the outer jacket 100 are plenum rated. In certain examples, the outer jacket 100 can be manufactured of a fire-retardant plastic material. In certain examples, the outer jacket 100 can be manufactured of a low smoke zero halogen material. Example materials for the outer jacket include polyvinyl chloride (PVC), fluorinated ethylene polymer (FEP), polyolefin formulations including, for example, polyethylene, and other materials.

The central passage 116 can contain one or more optical fibers 124. In certain examples, the optical fibers 124 can be coated optical fibers having cores less than 12 microns in diameter, cladding layers less than 140 microns in diameter, and coating layers less than 300 microns in diameter. It will be appreciated that the core and cladding layers typically include a silica based material. In certain examples, the cladding layer can have an index of a refraction that is less than the index of refraction of the core to allow optical signals that are transmitted through the optical fibers to be confined generally to the core. It will be appreciated that in certain examples, multiple cladding layers can be provided. In certain examples, optical fibers can include bend insensitive optical fibers having multiple cladding layers separated by trench layers. In certain examples, protective coatings (e.g., a polymeric material such as acetelate) can form coating layers around the cladding layers. In certain examples, the coating layers can have diameters less than 300 microns, or less than 260 microns, or in the range of 240 to 260 microns. In certain examples, the optical fibers 124 can be unbuffered. In other examples, the optical fibers can include a tight buffer layer, a loose buffer layer, or a semi-tight buffer layer. In certain examples, the buffer layers can have an outer diameter of about 800 to 1,000 microns. The optical fibers can include single mode optical fibers, multi-mode optical fibers, bend insensitive fibers or other fibers. In still other embodiments, the optical fibers 124 can be ribbonized.

Figure 4:
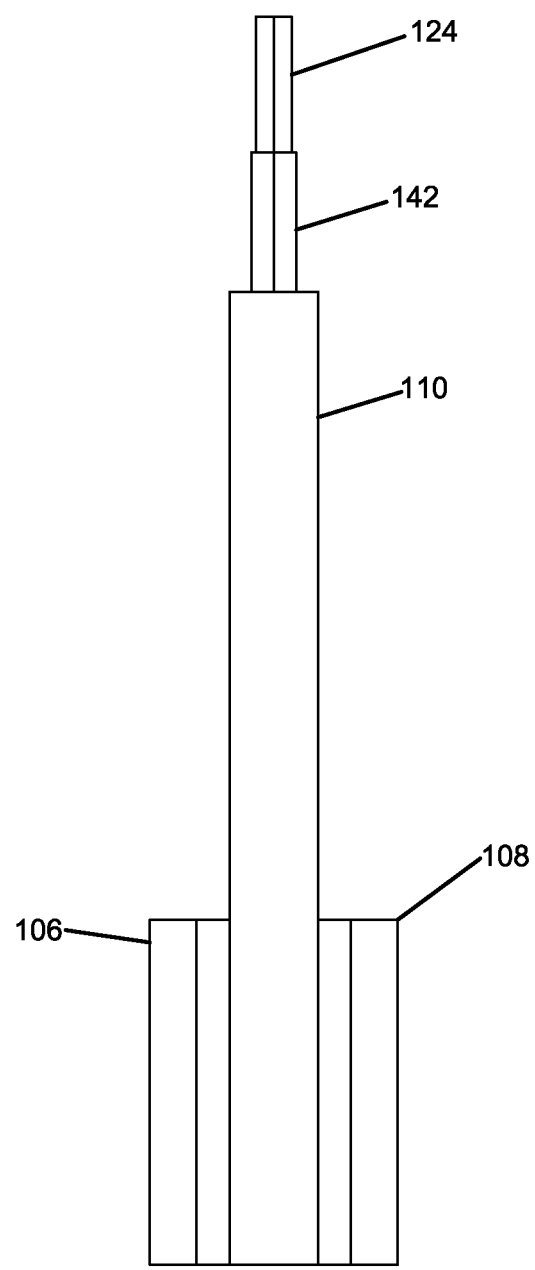
FIG. 4 is a plan view of the hybrid cable of FIGS. 2 and 3 with the electrically conductive portions of the hybrid cable trimmed relative to the central fiber optic portion of the hybrid cable.

As shown at FIG. 4, the left and right portions 106, 108 can be trimmed relative to the central portion 110 after the left and right portions 106, 104 have been torn away from the central portion 110. In this configuration, the central portion 110 extends distally beyond the ends of the left and right portions 106, 108. In certain examples, insulation displacement connectors can be used to pierce through the jacket materials of the left and right portions 106, 108 to electrically connect the left and right electrical connectors 120, 122 to an electrical power source, ground, active components or other structures. It will be appreciated that the optical fibers 124 can be directly terminated with optical connectors. In other examples, connectorized pigtails can be spliced to the ends of the optical fibers 124.

Referring back to FIG. 2, the outer jacket 100 includes a top side 130 and a bottom side 132 separated by the height H. As depicted, the top and bottom sides 130, 132 are generally parallel to one another. Each of the left and right pre-defined tear locations 126, 128 includes an upper slit 134 that extends downwardly from the top side 130, a lower slit 136 that extends upwardly from the bottom side 132 and a non-slitted portion 138 positioned between the upper and lower slits 134, 136. In one example embodiment, the upper and lower slits 134, 136 are partially re-closed slits. In the depicted embodiment, the left and right pre-defined tear locations 126, 128 also include jacket weakening members 140 that are imbedded in the non-slitted portions 138. By way of example, the jacket weakening members 140 can include strands, monofilaments, threads, filaments or other members. In certain examples, the jacket weakening members 140 extend along the central longitudinal axis 118 of the cable 20 for the length of the cable 20. In certain examples, the jacket weakening members 140 are aligned along the major axis 102. In certain examples, the upper and lower slits 130, 136 as well as the jacket weakening member 140 of the left pre-defined tear location 126 are aligned along a left tearing plane $P_L$ that is oriented generally perpendicular relative to the major axis 102. Similarly, the upper and lower slits 134, 136 as well as the jacket weakening member 140 of the right pre-defined tear location 128 are aligned along a right tearing plane $P_R$ that is oriented generally perpendicular with respect to the major axis 102.

Referring again to FIG. 2, the hybrid cable 20 can include a tensile strength structure 142 that provides tensile enforcement to the hybrid cable 20 so as to prevent tensile loads from being applied to the optical fibers 124. In certain embodiments, the tensile strength structure 142 can include reinforcing structures such as Aramid yarns or other reinforcing fibers. In still other embodiments, the tensile strength structure 142 can have an oriented polymeric construction. In still other examples, a tensile strength structure 142 can include a reinforcing tape. In certain examples, the reinforcing tape can be bonded to the outer jacket 100 so as to line the central passage 116. In certain examples, no central buffer tube is provided between the optical fibers 124 and the tensile reinforcing structure 142. In certain examples, the tensile strength structure 142 can include a reinforcing tape that extends along the length of the hybrid cable 20 and has longitudinal edges/ends 144 that are separated so as to define a gap 144 therein between. In use, the tensile strength member 142 can be anchored to a structure such as a fiber optic connector, housing or other structure so as to limit the transfer of tensile load to the optical fibers 124. It will be appreciated that the tensile strength structure 142 can be anchored by techniques such as crimping, adhesives, fasteners, bands or other structures.

Figure 5:
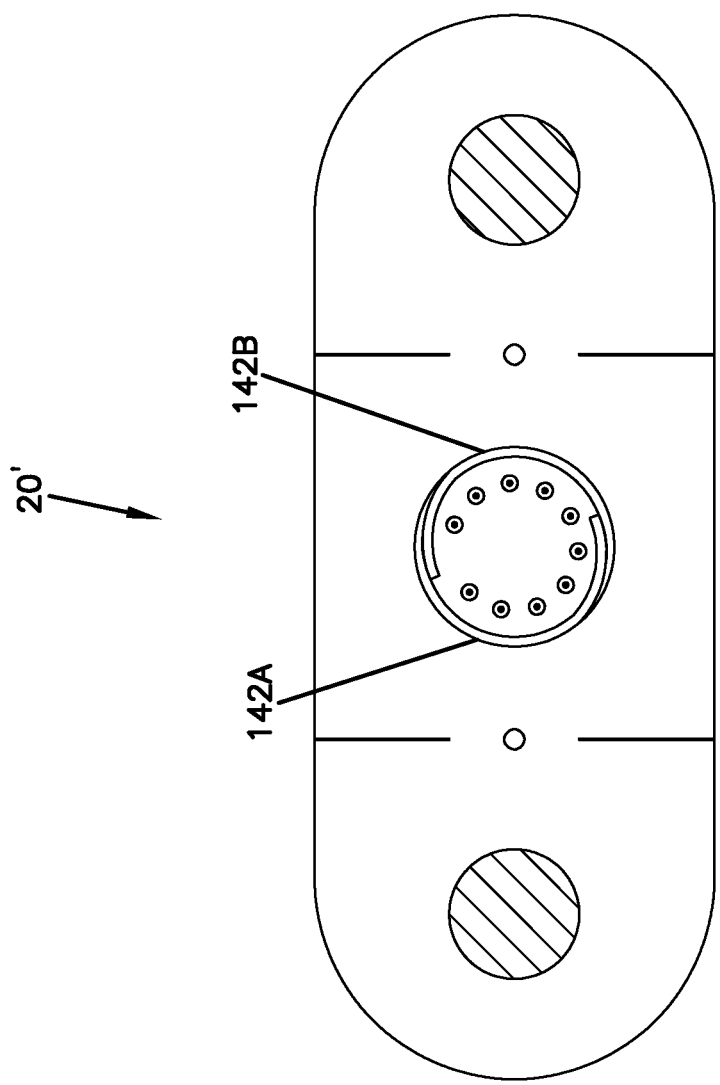
FIG. 5 is a transverse cross-sectional view of another power/optical fiber hybrid cable in accordance with the principles of the present disclosure.

FIG. 5 shows an alternative hybrid cable 20' having the same construction as the hybrid cable 20 except two tensile strength structures 142A, 142B have been provided within the central passage 116. Tensile strength members 142A, 142B each include a tensile reinforcing tape that is bonded to the central portion 110 of the outer jacket 100. The tensile strength members 142A, 142B can include portions that circumferentially overlap one another within the central passage 116. In certain examples, by stripping away an end portion of the central portion 110, the tensile strength structures 142A, 142B can be exposed and readily secured to a structure such as a fiber optic connector, a panel, a housing or other structure. In one example, the tensile strength structures 142A, 142B can be crimped, adhesively secured or otherwise attached to rods (e.g., epoxy rods reinforced with fibers) that are in turn secured within a ruggedized fiber optic connector such as the fiber optic connector disclosed at U.S. Pat. No. 7,744,288 which is hereby incorporated by reference in its entirety, or the fiber optic connector disclosed at U.S. Pat. No. 7,918,609, which is hereby incorporated by reference in its entirety.

It will be appreciated that cables in accordance with the principles of the present disclosure can be manufactured using a one-pass manufacturing process. In certain examples, the same one-pass manufacturing process can be used to manufacture different types of cables by substituting in different types of electrical conductors (e.g., stranded or non-stranded) and by using different types of optical fibers (e.g., buffered optical fibers, non-buffered optical fibers, ribbonized fibers, multi-mode fibers, single-mode fibers, bend insensitive fibers, etc.).

Figure 6:
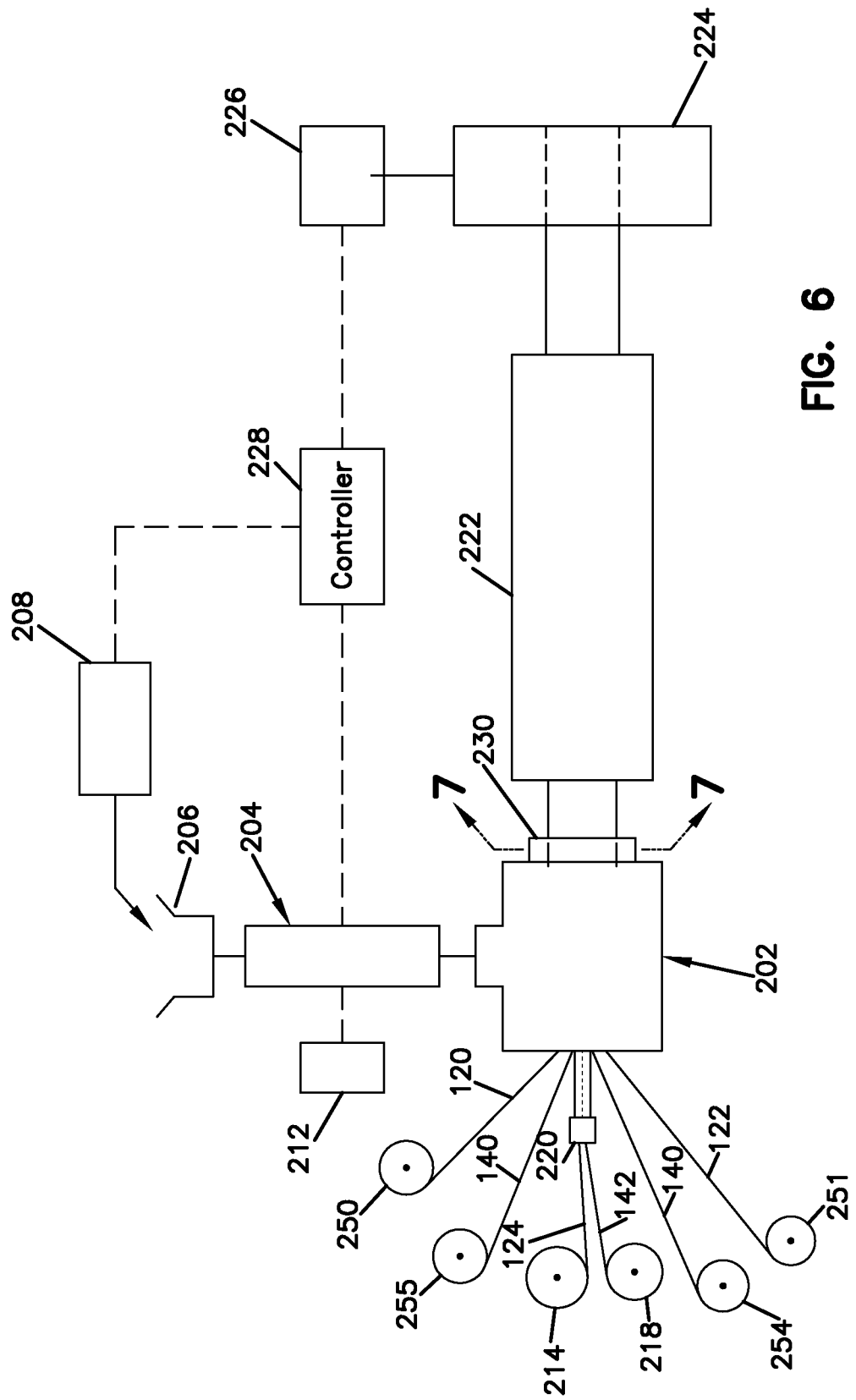
FIG. 6 is a schematic representation of a system for manufacturing the hybrid cables in accordance with the principles of the present disclosure.
Figure 7:
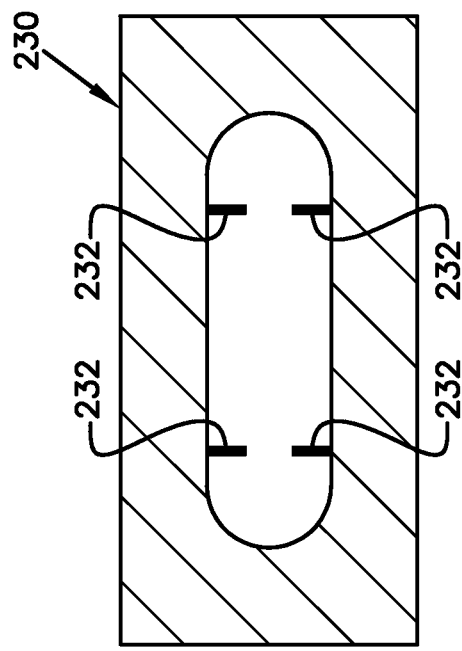
FIG. 7 is a cross-sectional view taken along section line 7-7 of FIG. 6.

Referring to FIG. 6, a schematic representation of a system 200 for making the fiber optic cable 20 is shown. The system 200 includes a cross head, generally designated 202, that receives polymeric (e.g., thermoplastic) material from an extruder 204. A hopper 206 is used to feed material into the extruder 204. A conveyor 208 can be used to convey material (e.g., base material and possibly additives) to the hopper 206. In other embodiments, additional conveyors can be used to convey additional materials to the hopper 206. The extruder 204 is heated by a heating system 212 that may include one or more heating elements for heating zones of the extruder as well as the cross head 202 to desired processing temperatures.

One or more of the optical fibers 124 can be fed into the cross head 202 from one or more feed rolls 214. The system 200 can also include one or more supply rolls 218 for feeding the tensile strength structure 142 or structures to the cross-head 202 and a longitudinal shaping tool 220. The tensile strength structure 142 is disposed on the supply roll 218. The shaping tool 220 is used to form/shape the tensile strength structure 142 (e.g., one or more pieces of reinforcing tape) into a generally cylindrical shape that surrounds the one or more fibers 124 prior to entering the cross-head 202. The system 200 further includes feed rolls 250, 251 for feeding the electrical conductors 120, 122 into the cross-head 202, and feed rolls 254, 255 for feeding the jacket weakening members 140 into the cross-head 202.

A water trough 222 is located downstream from the cross head 202 for cooling the extruded product that exits the cross head 202. The cooled final product is stored on a take-up roll 224 rotated by a drive mechanism 226. A controller 228 can coordinate the operation of the various components of the system 200. The cross-head 202 can be configured to provide the jacket 100 with the desired transverse cross-sectional shape of FIG. 2. The system 200 further includes a slitting module 230 located immediately downstream from the cross head 202. The slitting module 230 includes blade slitting blades 232 that form slits in the outer jacket 100 corresponding to the upper and lower slits 134, 136. Preferably, the slitting blades 232 slit the outer jacket 100 while the material of the outer jacket is still at least partially molten. In this way, in certain examples, the slits at least partially reclose after slitting. In this way, the slits form weakened portions in the jacket. In other embodiments, the slits may remain fully open.

In use, the optical fibers 124, the left and right electrical conductors 120, 122, the tensile reinforcing structure 142 and the jacket weakening members 140 are all fed through the cross head 202. Prior to reaching the cross head 202, the shaping tool 220 can shape the tensile strength structure 142 around the optical fibers 120 such that the tensile strength member 142 surrounds the optical fibers as the optical fibers and the tensile strength structure 142 pass through the cross-head 202. As the components pass through the cross head, the material of the outer jacket 100 is extruded about the cylindrical tensile strength structure 142 as well as about the left and right electrical conductors 120, 122 and the jacket weakening members 140. In certain examples, the material forming the outer jacket 100 of the cable 20 leaves the cross-head 202 having a shape/profile of the type shown at FIG. 2. Thereafter, the cutting blades 232 of the slitting module 230 slit the upper and lower slits 134, 136 into the jacket. The cable is then cooled at the trough 222 and is collected on the take-up spool 224.

Various modifications and alterations of this disclosure will become apparent to those skilled in the art without departing from the scope and spirit of this disclosure, and it should be understood that the scope of this disclosure is not to be unduly limited to the illustrative examples set forth herein.

What is claimed is:

1. A hybrid cable comprising:
   an outer jacket having a transverse cross-sectional profile that defines a major axis and a minor axis, the outer jacket having a height measured along the minor axis and a width measured along the major axis, the width being greater than the height such that the transverse cross-sectional profile of the outer jacket is elongated along the major axis;
   the outer jacket including a left portion, a right portion and a central portion, the left, right and central portions being positioned along the major axis with the central portion being disposed between the left and right portions, the left portion defining a left passage, the right portion defining a right passage and the central portion defining a central passage;
   the outer jacket including a top side and an opposite bottom side separated by the height;
   a left electrical conductor positioned within the left passage;
   a right electrical conductor positioned within the right passage;
   at least one optical fiber positioned within the central passage;
   the hybrid cable including a left pre-defined tear location positioned between the central portion and the left portion of the outer jacket and a right pre-defined tear location positioned between the central portion and the right portion of the outer jacket;
   the left pre-defined tear location being weakened such that the left portion of the outer jacket can be manually torn from the central portion of the outer jacket, and the left pre-defined tear location being configured such that the left portion of the outer jacket fully surrounds the left passage and the central portion of the outer jacket fully surrounds the central passage after the left portion of the outer jacket has been torn from the central portion of the outer jacket; and
   the right pre-defined tear location being weakened such that the right portion of the outer jacket can be manually torn from the central portion of the outer jacket, and the right pre-defined tear location being configured such that the right portion of the outer jacket fully surrounds the right passage and the central portion of the outer jacket fully surrounds the central passage after the right portion of the outer jacket has been torn from the central portion of the outer jacket;

the left and right pre-defined tear locations each including an upper slit that extends downwardly from the top side, a lower slit that extends upwardly from the bottom side, and a non-slitted portion positioned between the upper and lower slits; and the central portion of the outer jacket having a rectangular transverse cross-sectional shape after the left and right portions of the outer jacket are torn away from the central portion of the outer jacket along the upper and lower slits.

2. The hybrid cable of claim 1, wherein jacket weakening members are embedded in the non-slitted portions.

3. The hybrid cable of claim 2, wherein the jacket weakening members are aligned along the major axis.

4. The hybrid cable of claim 1, wherein the upper and lower slits of the left pre-defined tear location are aligned along a left tearing plane, and wherein the upper and lower slits of the right pre-defined tear location are aligned along a right tearing plane.

5. The hybrid cable of claim 4, wherein the left and right pre-defined tear locations each include a jacket weakening member embedded in the non-slitted portions of the outer jacket between the upper and lower slits.

6. The hybrid cable of claim 5, wherein the jacket weakening members are positioned along the major axis.

7. The hybrid cable of claim 1, wherein the first and second electrical conductors are solid metal or braided metal.

8. The hybrid cable of claim 7, wherein the first and second electrical conductors are solid copper or braided copper.

9. The hybrid cable of claim 1, further comprising a tensile strength structure positioned within the central passage.

10. The hybrid cable of claim 9, wherein the tensile strength structure is bonded to the outer jacket.

11. The hybrid cable of claim 9, wherein the tensile strength structure includes a reinforcing tape.

12. The hybrid cable of claim 11, wherein the reinforcing tape is bonded to the outer jacket and include aramid yarns.

13. The hybrid cable of claim 9, further comprising first and second reinforcing tapes positioned within the central passage.

14. The hybrid cable of claim 13, wherein the first and second reinforcing tapes have longitudinal portions that overlap one another.

15. The hybrid cable of claim 1, wherein a plurality of optical fibers are positioned within the central passage.

16. The hybrid cable of claim 15, wherein no buffer tube is provided in the central passage, and wherein the optical fibers are coated optical fibers without buffer layers.

17. The hybrid cable of claim 16, wherein the coated optical fibers have outer diameters less than 300 microns.

18. The hybrid cable of claim 1, wherein the upper and lower slits are uninterrupted and run continuously along a length of the hybrid cable.

19. The hybrid cable of claim 1, wherein the top and bottom sides of the outer jacket are flat and generally parallel to one another, the top and bottom sides each having a constant thickness.

20. The hybrid cable of claim 5, wherein the jacket weakening members include strands, monofilaments, threads, or filaments.

21. The hybrid cable of claim 2, wherein the jacket weakening members include strands, monofilaments, threads, or filaments.

22. The hybrid cable of claim 1, wherein the upper and lower slits remain fully open after slitting.

23. The hybrid cable of claim 1, wherein a distance between the upper and lower slits measured through the non-slitted portion in an orientation along the height is less than a length of the upper slit measured in the orientation along the height and is also less than a length of the lower slit measured in the orientation along the height.

24. The hybrid cable of claim 23, wherein the outer jacket is made from a material having a composition that includes at least one of the following materials: a low smoke zero halogen material, a polyvinyl chloride (PVC) material, a fluorinated ethylene polymer (FEP) material, and a material having a polyolefin formulation.

* * * * *